United States Patent
Park

(10) Patent No.: US 11,474,939 B2
(45) Date of Patent: Oct. 18, 2022

(54) MEMORY DEVICE FOR IMPROVING SPEED OF CACHE READ OPERATION AND METHOD OF OPERATING THE SAME

(71) Applicant: SK hynix Inc., Gyeonggi-do (KR)

(72) Inventor: Yong Soon Park, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/083,482

(22) Filed: Oct. 29, 2020

(65) Prior Publication Data

US 2021/0397553 A1    Dec. 23, 2021

(30) Foreign Application Priority Data

Jun. 22, 2020 (KR) .................. 10-2020-0076054

(51) Int. Cl.
*G06F 12/0802* (2016.01)
*G06F 3/06* (2006.01)

(52) U.S. Cl.
CPC ........ *G06F 12/0802* (2013.01); *G06F 3/0604* (2013.01); *G06F 3/0659* (2013.01); *G06F 3/0679* (2013.01); *G06F 2212/72* (2013.01)

(58) Field of Classification Search
CPC .... G06F 3/0604; G06F 3/0659; G06F 3/0679; G06F 12/0802; G06F 2212/72; G06F 12/0868; G06F 12/0871; G06F 12/0875; G06F 12/0897; G06F 2212/1016; G06F 2212/1024; G06F 2212/1032; G06F 2212/214; G06F 2212/283; G06F 2212/7203; G06F 2212/7208

See application file for complete search history.

(56) References Cited

U.S. PATENT DOCUMENTS

| | | | | |
|---|---|---|---|---|
| 5,956,743 A | * | 9/1999 | Bruce | G06F 11/1068 711/103 |
| 2008/0270678 A1 | * | 10/2008 | Cornwell | G06F 3/0688 711/103 |
| 2010/0229007 A1 | * | 9/2010 | Park | G11C 7/1006 713/193 |
| 2014/0223071 A1 | * | 8/2014 | Bert | G06F 13/28 711/103 |

FOREIGN PATENT DOCUMENTS

KR    10-1201662    11/2012
KR    10-2019-0090268    8/2019

* cited by examiner

*Primary Examiner* — Larry T Mackall
(74) *Attorney, Agent, or Firm* — IP & T Group LLP

(57) ABSTRACT

The present technology relates to a memory device and a method of operating the same. The memory device includes a memory cell array including a plurality of memory cells, a data register connected to the memory cell array through a bit line and configured to store data sensed through the bit line, a cache register configured to cache the data stored in the data register, and a control logic configured to control a caching operation of receiving a cache read command from a memory controller and storing the data, which is stored in the data register, in the cache register, during a cache read period, in response to the cache read command, wherein the control logic controls the caching operation based on whether the cache read command is a first command received after receiving a normal read command from the memory controller.

18 Claims, 14 Drawing Sheets

MEMORY DEVICE FOR IMPROVING SPEED OF CACHE READ OPERATION AND METHOD OF OPERATING THE SAME

CROSS-REFERENCE TO RELATED APPLICATION

The present application claims priority under 35 U.S.C. § 119(a) to Korean patent application number 10-2020-0076054, filed on Jun. 22, 2020, which is incorporated herein by reference in its entirety.

BACKGROUND

1. Field of Invention

The present disclosure relates to a memory device, and more particularly, to a memory device and a method of operating the same.

2. Description of Related Art

A storage device is a device that stores data under control of a host device such as a computer or a smartphone. The storage device may include a memory device in which data is stored and a memory controller controlling the memory device. The memory device is divided into a volatile memory device and a non-volatile memory device.

The volatile memory device is a device that stores data only when power is supplied and loses the stored data when the power supply is cut off. Examples of the volatile memory device include a static random access memory (SRAM), a dynamic random access memory (DRAM), and the like.

The non-volatile memory device is a device that does not lose data even though power is cut off. Examples of the non-volatile memory device include a read only memory (ROM), a programmable ROM (PROM), an electrically programmable ROM (EPROM), an electrically erasable and programmable ROM (EEPROM), a flash memory, and the like.

SUMMARY

An embodiment of the present disclosure provides a memory device capable of improving a speed of a cache read operation and a method of operating the same.

A memory device according to an embodiment may include a memory cell array including a plurality of memory cells, a data register connected to the memory cell array through a bit line and configured to store data sensed through the bit line, a cache register configured to cache the data stored in the data register, and a control logic configured to control a caching operation of receiving a cache read command from a memory controller and storing the data, which is stored in the data register, in the cache register, during a cache read period, in response to the cache read command.

The control logic may control the caching operation based on whether the cache read command is a first command received after receiving a normal read command from the memory controller.

A method of operating a memory device according to an embodiment may include receiving a cache read command from a memory controller, determining whether the cache read command is a first command received after receiving a normal read command from the memory controller, and performing a caching operation of storing data, which is stored in a data register, in a cache register according to the determination.

An operating method of a memory device according to an embodiment may include providing, when first and second data are stored in respective data and cache registers, the first data from the cache register in response to a cache read command by caching the first data from the data register into the cache register, and providing, when the first data is stored in both the data and cache registers, the first data from the cache register in response to the cache read command without the caching.

The present technology may provide a memory device capable of improving a speed of a cache read operation and a method of operating the same.

DETAILED DESCRIPTION

Specific structural or functional descriptions of embodiments which are disclosed in the present disclosure or application are illustrated only to describe the embodiments of the present disclosure. The embodiments of the present disclosure may be carried out in various forms and the descriptions are not limited to the embodiments described in the present disclosure or application.

Figure 1:
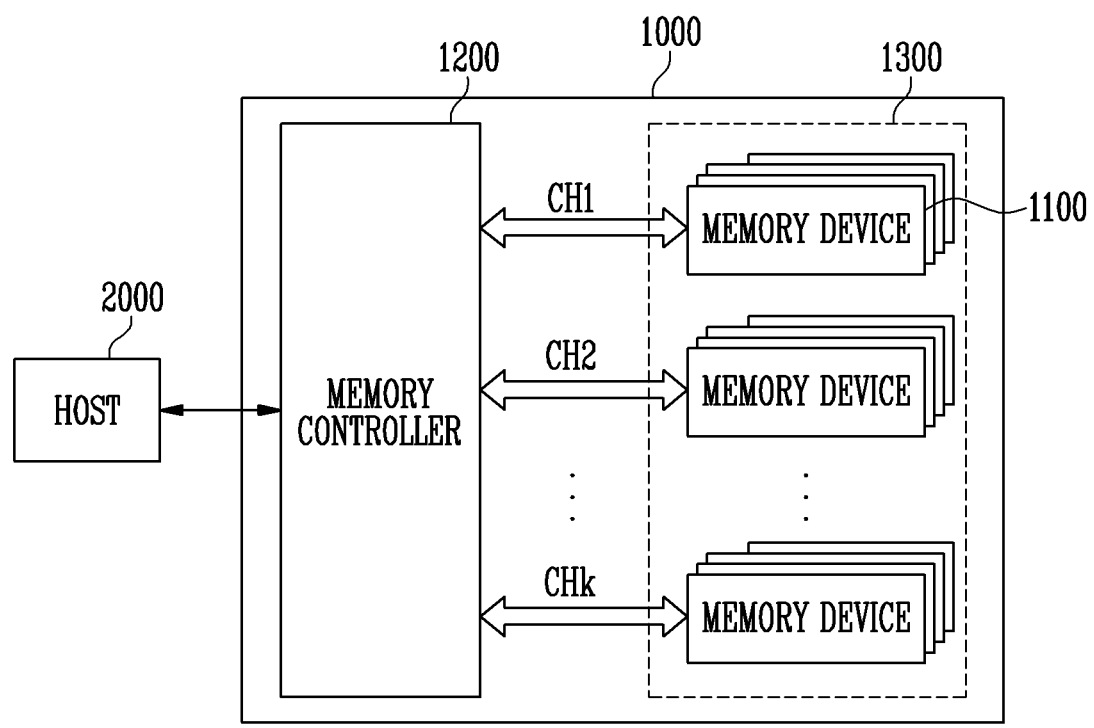
FIG. 1 is a diagram for illustrating a memory system according to an embodiment of the present disclosure.

FIG. 1 is a diagram for illustrating a memory system according to an embodiment of the present disclosure.

Referring to FIG. 1, the memory system 1000 may include a memory device 1100 in which data is stored, and/or a memory controller 1200 that controls the memory device 1100 according to a request of a host 2000.

The host 2000 may communicate with the memory system 1000 using at least one of various communication methods such as a universal serial bus (USB), a serial AT attachment (SATA), a serial attached SCSI (SAS), a high speed interchip (HSIC), a small computer system interface (SCSI), a peripheral component interconnection (PCI), a PCI express (PCIe), a nonvolatile memory express (NVMe), a universal flash storage (UFS), a secure digital (SD), a multimedia card (MMC), an embedded MMC (eMMC), a dual in-line memory module (DIMM), a registered DIMM (RDIMM), and a load reduced DIMM (LRDIMM).

The memory device 1100 may be implemented as a volatile memory device in which data is lost when the power supply is cut off or a non-volatile memory device in which data is maintained even though the power supply is cut off. The memory device 1100 may perform a program operation, a read operation, or an erase operation under control of the memory controller 1200. For example, during the program operation, the memory device 1100 may receive a command, an address, and data from the memory controller 1200 and perform the program operation. During the read operation, the memory device 1100 may receive a command and an address from the memory controller 1200, and output read data to the memory controller 1200. The memory device 1100 may be referred to as a chip, a die or an individual integrated chip (IC).

The memory system 1000 may include memory device groups 1300 in which a plurality of memory devices 1100 are grouped, and the memory devices 1100 belonging to each of the memory device groups 1300 may communicate with the memory controller 1200 through respective channels CH1 to CHk. Hereinafter, for convenience of description, four memory devices are included in one memory device group connected to one channel, but the present disclosure is not limited thereto.

The memory controller 1200 may control an overall operation of the memory system 1000 and control data exchange between the host 2000 and the memory device 1100. For example, when a command is received from the host 2000, the memory controller 1200 may control the respective memory device groups 1300 connected to the respective channels CH1 to CHk according to the received command. The memory controller 1200 may control the memory devices 1100 included in the memory device groups 1300 connected to the respective channels according to the request of the host 2000 to program, read, or erase data. In addition, the memory controller 1200 may receive data and a logical address from the host 2000, and convert the logical address into a physical address indicating an area in which data is actually stored in the memory device 1100. In addition, the memory controller 1200 may store a logical-to-physical address mapping table configuring a mapping relationship between the logical address and the physical addresses in a buffer memory (not shown).

The memory controller 1200 may perform a status read operation for determining a status of at least one of the memory devices 1100 before or during control of a specific operation of the memory devices 1100. For example, the memory controller 1200 may transmit a status read command to the memory devices 1100, and at least one of the memory devices 1100 may output status information to the memory controller 1200 in response to the status read command. In addition, the memory controller 1200 may transmit the status read command to the memory devices 1100 to monitor whether a previously issued command is completed.

Figure 2:
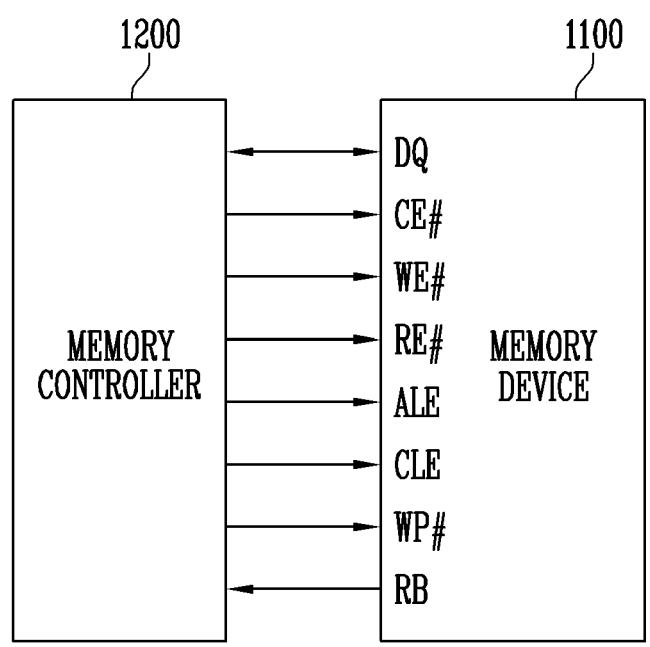
FIG. 2 is a diagram for illustrating signals exchanged between a memory controller and a memory device according to FIG. 1.

FIG. 2 is a diagram for illustrating signals exchanged between the memory controller and the memory device according to FIG. 1.

Referring to FIG. 2, the memory controller 1200 and the memory device 1100 may exchange a command, data, and/or an address with each other through an input/output pad DQ. For example, the input/output pad DQ may be configured of eight lines to transmit and receive data of 8 bits, and each line may transmit and receive data of 1 bit.

The memory device 1100 may receive a chip enable signal through a CE # pad, receive a write enable signal through a WE # pad, receive a read enable signal through an RE # pad, receive an address latch enable signal through an ALE pad, receive a command latch enable signal through a CLE pad, and receive a write protection signal through a WP # pad.

The address latch enable signal may be a signal sent by the memory controller 1200 to the memory device 1100 so that the memory device 1100 loads the address provided to the memory device 1100 through the input/output pad DQ in an address register. The chip enable signal may be a signal sent by the memory controller 1200 to the memory device 1100 to enable or disable one or more memory devices. The command latch enable signal may be a signal sent by the memory controller 1200 to the memory device 1100 so that the memory device 1100 loads the command provided to the memory device 1100 through the input/output pad DQ in a command register. The read enable signal may be a signal sent by the memory controller 1200 to the memory device 1100 so that the memory device 1100 transmits the data to the memory controller 1200. The write enable signal may be a signal informing that the command, the address, and the data are transferred.

The memory device 1100 may output a ready-busy signal to the memory controller 1200 through an RB pad. The ready-busy signal may indicate whether a memory array of the memory device 1100 is in a busy state or an idle state.

FIG. 2 shows a connection relationship between one memory device 1100 and the memory controller 1200. However, the input/output pad DQ, the CE # pad, the WE # pad, the RE # pad, the ALE pad, the CLE pad, the WP # pads may form one channel, and the memory controller 1200 and one of the memory device groups 1300 may be connected through the formed channel. For example, one of the memory device groups 1300 may be connected to the CE # pad.

Therefore, when the memory controller 1200 transmits the command, the data, and/or the address through the input/output pad DQ included in one channel, all of the memory devices 1100 connected to the corresponding channel or a memory device 1100 selected among the memory devices 1100 connected to the corresponding channel may receive the command, the data, and/or the address. For example, the memory controller 1200 may transmit the status read command to the memory devices 1100 connected to the corresponding input/output pad DQ through the input/output pad DQ, and at least one of the memory devices 1100 receiving the status read command may transmit the status information to the input/output pad DQ in response to the status read command.

Figure 3:
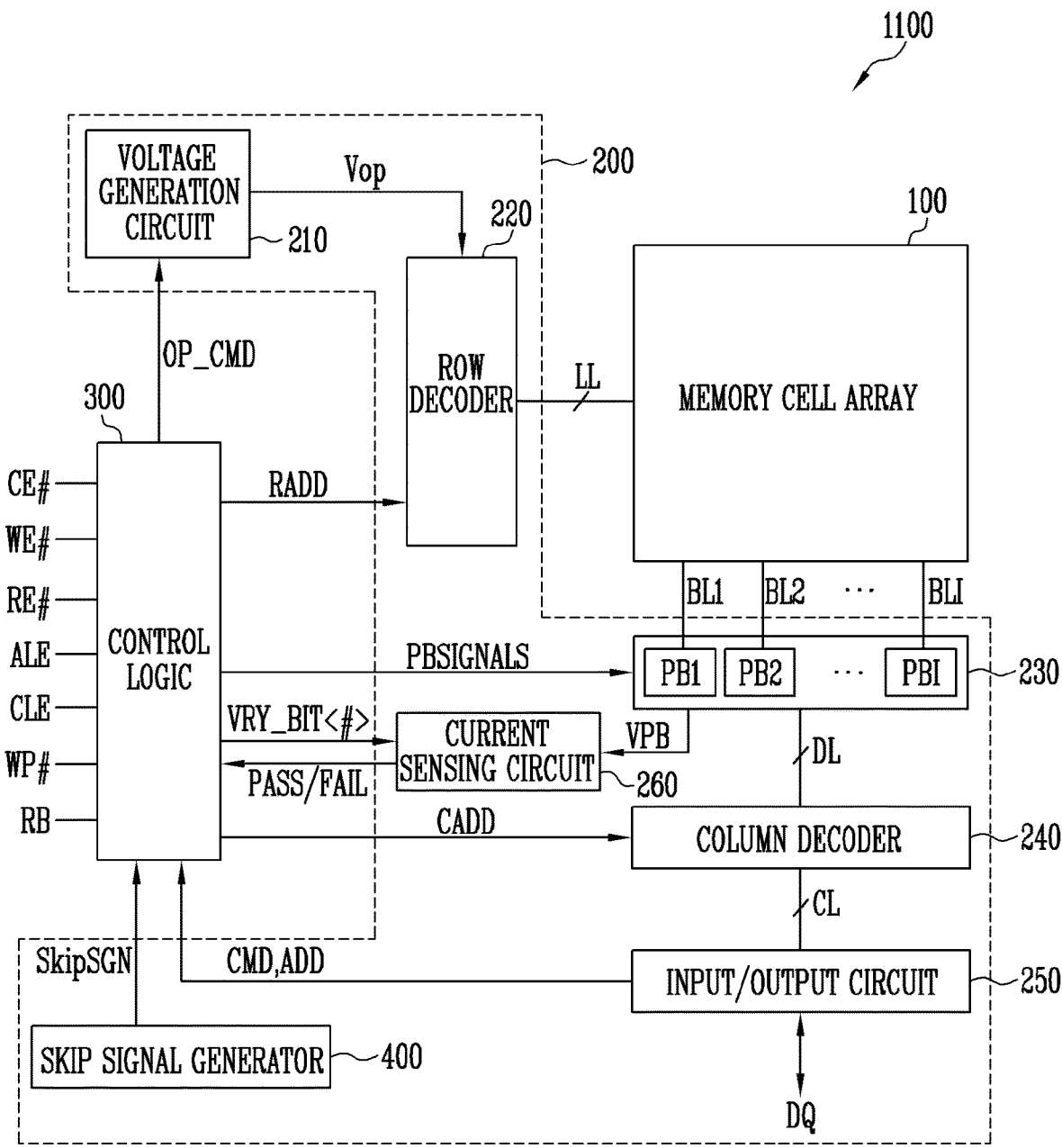
FIG. 3 is a diagram for illustrating the memory device of FIG. 1.

FIG. 3 is a diagram for illustrating the memory device of FIG. 1.

Referring to FIG. 3, the memory device 1100 may be implemented as a volatile memory device or a non-volatile memory device. In FIG. 3, a non-volatile memory device is shown as an embodiment, but the present embodiment is not limited to the non-volatile memory device.

The memory device 1100 may include a memory cell array 100 in which data is stored. The memory device 1100 may include peripheral circuits 200 configured to perform a program operation for storing data in the memory cell array 100, a read operation for outputting the stored data, and an erase operation for erasing the stored data. The memory device 1100 may include a control logic 300 that controls the peripheral circuits 200 under control of the memory controller 1200.

The memory cell array 100 includes a plurality of memory cells in which data is stored. For example, the memory cell array 100 may include at least one plane, the plane may include one or more memory blocks. In an embodiment, the plane may be a unit of a memory area accessed when the program, read, or erase operation is performed. Each of the memory blocks may include a plurality of memory cells. A structure including a plurality of planes may be referred to as a multi-plane structure. User data and information necessary for an operation of the memory device 1100 may be stored in the memory blocks. The memory blocks may be implemented in a two-dimensional or three-dimensional structure. The memory blocks having the two-dimensional structure may include memory cells arranged parallel to a substrate, and the memory blocks having the three-dimensional structure may include memory cells stacked vertically on the substrate.

The peripheral circuits 200 may be configured to perform the program, read, and erase operations according to the control of the control logic 300. For example, the peripheral circuits 200 may include a voltage generation circuit 210, a row decoder 220, a page buffer group 230, a column decoder 240, an input/output circuit 250, a current sensing circuit 260, and a skip signal generator 400.

The voltage generation circuit 210 may generate various operation voltages Vop used for the program, read, and erase operations, in response to an operation signal OP_CMD output from the control logic 300. For example, the voltage generation circuit 210 may generate various voltages, such as a program voltage, a verify voltage, a pass voltage, a read voltage, and an erase voltage, under the control of the control logic 300.

The row decoder 220 may supply the operation voltages Vop to local lines LL connected to a selected memory block among the memory blocks of the memory cell array 100, in response to a row address RADD output from the control logic 300. The local lines LL may include local word lines, local drain select lines, and/or local source select lines. In addition, the local lines LL may include various lines connected to the memory block, such as a source line.

The page buffer group 230 may be connected to bit lines BL1 to BLI connected to the memory blocks of the memory cell array 100. The page buffer group 230 may include a plurality of page buffers PB1 to PBI connected to the bit lines BL1 to BLI. The page buffers PB1 to PBI may operate in response to page buffer control signals PBSIGNALS output from the control logic 300. For example, the page buffers PB1 to PBI may temporarily store data received through the bit lines BL1 to BLI, or may sense a voltage or a current of the bit lines BL1 to BLI during the read operation or a verify operation.

The column decoder 240 may transfer data between the input/output circuit 250 and the page buffer group 230 in response to a column address CADD output from the control logic 300. For example, the column decoder 240 may exchange data with the page buffers PB1 to PBI through data lines DL, or exchange data with the input/output circuit 250 through column lines CL.

The input/output circuit 250 may receive a command CMD, an address ADD, and data from the memory controller 1200 through the input/output pad DQ, and output data read from the memory cell array 100 to the memory controller 1200 through the input/output pad DQ. For example, the input/output circuit 250 may transfer the command CMD and the address ADD received from the memory controller 1200 to the control logic 300 or exchange data DATA with the column decoder 240.

During the read operation or the verify operation, the current sensing circuit 260 may generate a reference current in response to a permission bit VRY_BIT<#>, compare a sensing voltage VPB received from the page buffer group 230 with a reference voltage generated by the reference current, and output a pass signal PASS or a fail signal FAIL.

The control logic 300 may receive the command CMD and the address ADD in response to the signals received through the CE #, WE #, RE #, ALE, CLE, and WP # pads. The control logic 300 may generate control signals for controlling the peripheral circuits 200 in response to receiving the command CMD and the address ADD, and output the generated control signals to the peripheral circuits 200. For example, the control signals may include at least one of the operation signal OP_CMD, the row address RADD, the page buffer control signals PBSIGNALS, and the permission bit VRY_BIT<#>. The control logic 300 may output the operation signal OP_CMD to the voltage generation circuit 210, output the row address RADD to the row decoder 220, output the page buffer control signals PBSIGNALS to the page buffer group 230, and output the permission bit VRY_BIT<#> to the current sensing circuit 260. In addition, the control logic 300 may determine whether the verify operation is passed or failed in response to the pass signal PASS or the FAIL signal. Here, the command CMD may include a cache read command for performing the read operation at a high speed using a cache register of the memory device 1100.

The control logic 300 may receive a cache read command from the memory controller 1200, and may perform a caching operation of storing data, which is stored in a data register, in a cache register, during a cache read period, based on whether the received cache read command is a first command received after receiving a normal read command from the memory controller 1200.

For example, the control logic 300 may perform the caching operation when the cache read command is not the first command received after receiving the normal read command from the memory controller 1200.

A skip signal generator 400 may determine whether the cache read command is the first command after receiving the normal read command from the memory controller 1200, and supply a skip signal SkipSGN instructing the control logic 300 to skip the caching operation, according to the determination.

The control logic 300 may skip the caching operation during the cache read period based on the skip signal SkipSGN. At this time, the control logic 300 may provide at least one signal (see FIGS. 11 to 12 described later) required to generate the skip signal SkipSGN to the skip signal generator 400.

The control logic 300 may output a ready-busy signal indicating a busy state of the memory device 1100 during a second period shorter than the cache read period to the memory controller 1200 in response to the skip signal SkipSGN. For example, the second period may be a first cache read period tDCBSYR1' described later with reference to FIG. 11.

The control logic 300 may receive the normal read command from the memory controller 1200 and supply a normal read signal to the skip signal generator 400 during a third period longer than the cache read period in response to the normal read command. For example, the third period may be a normal read period tR described later with reference to FIG. 9 or 11.

Figure 4:
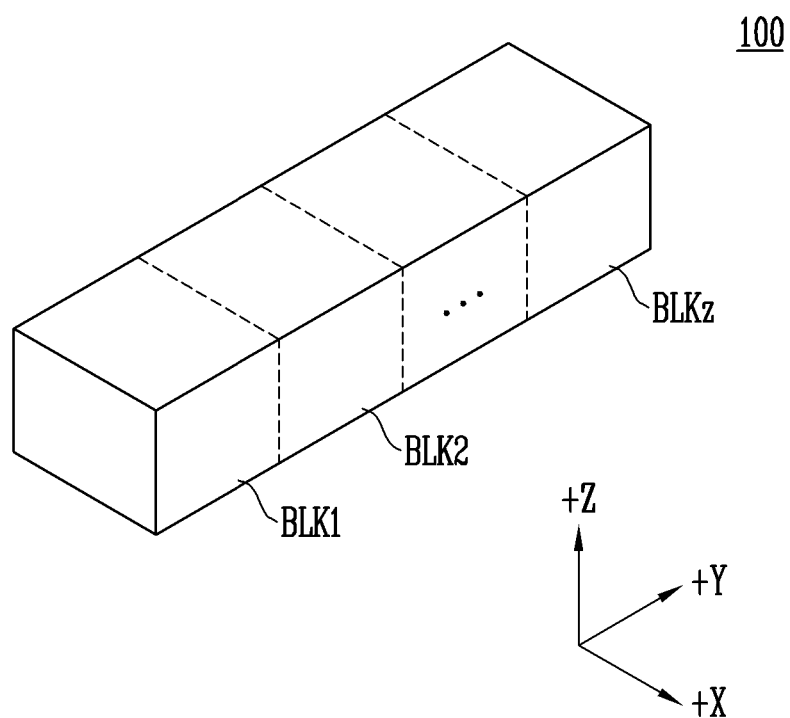
FIG. 4 is a diagram illustrating an embodiment of a memory cell array of FIG. 3.

FIG. 4 is a diagram illustrating an embodiment of the memory cell array of FIG. 3.

Referring to FIG. 4, the memory cell array 100 includes a plurality of memory blocks BLK1 to BLKz. Each memory block may have a three-dimensional structure. Each memory block may include a plurality of memory cells stacked on a substrate. The plurality of memory cells may be arranged along a +X direction, a +Y direction, and a +Z direction.

Figure 5:
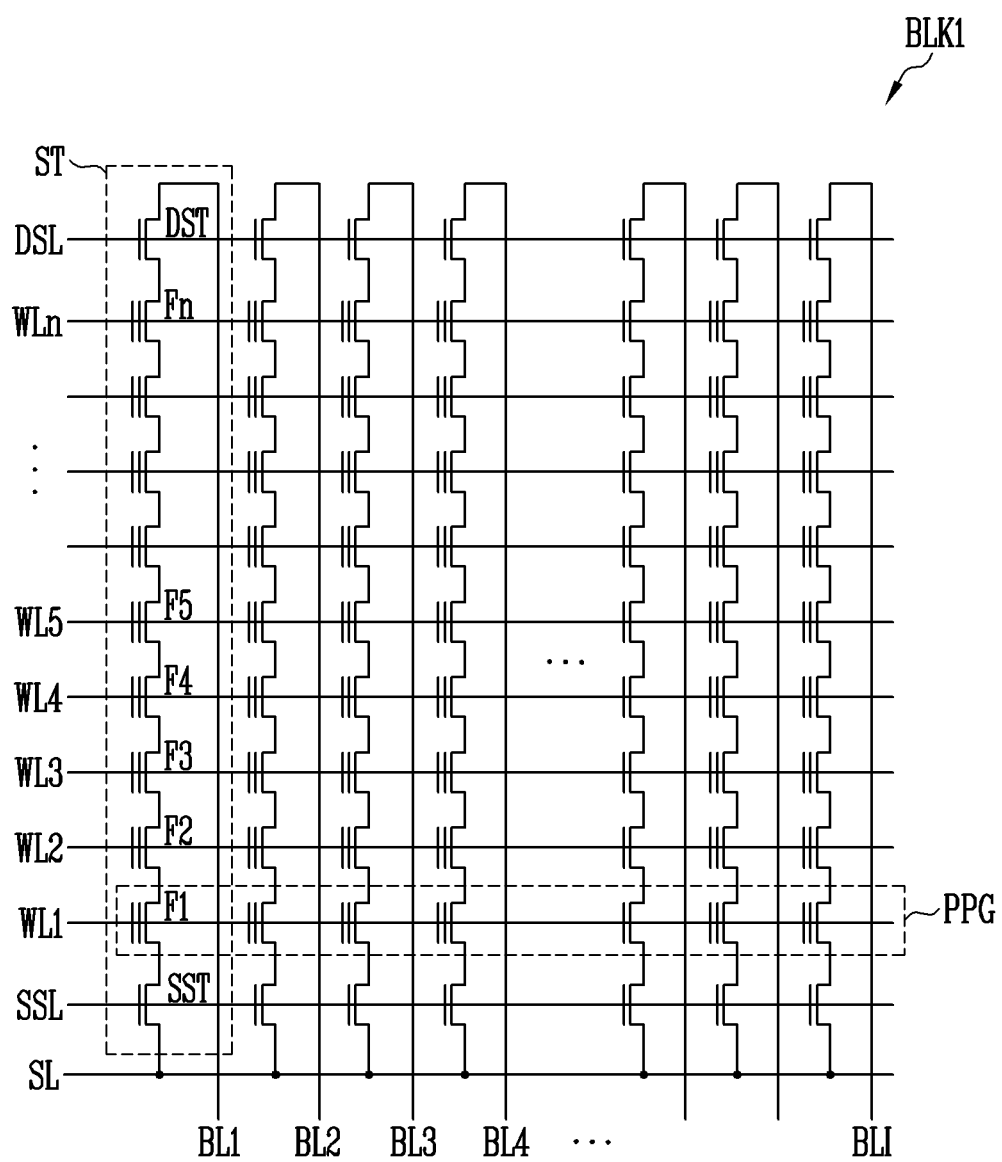
FIG. 5 is a diagram for illustrating a memory block of FIG. 4.

FIG. 5 is a diagram for illustrating the memory block of FIG. 4.

Referring to FIG. 5, the first memory block BLK1 among the plurality of memory blocks BLK1 to BLKz shown in FIG. 4 is shown. The remaining memory blocks BLK2 to BLKz may have the same shape as the first memory block BLK1.

The first memory block BLK1 may include a plurality of cell strings ST connected between bit lines BL1 to BLI and a source line SL. For example, the cell strings ST may be connected to the bit lines BL1 to BLI, respectively, and may be commonly connected to the source line SL. Since the cell strings ST are configured similarly to each other, a cell string ST connected to the first bit line BL1 is described as a following example.

The cell string ST may include a source select transistor SST, first to n-th memory cells F1 to Fn (n is a positive integer), and a drain select transistor DST connected in series between the source line SL and the first bit line BL1. The number of source and drain select transistors SST and DST is not limited to the number shown in FIG. 5. The source select transistor SST may be connected between the source line SL and the first memory cell F1. The first to n-th memory cells F1 to Fn may be connected in series between the source select transistor SST and the drain select transistor DST. The drain select transistor DST may be connected between the n-th memory cell Fn and the first bit line BL1. Although not shown in the drawing, dummy cells may be further connected between the memory cells F1 to Fn or between the source select transistor SST and the drain select transistor DST.

Gates of the source select transistors SST included in the different cell strings ST may be connected to a source select line SSL, gates of the first to n-th memory cells F1 to Fn may be connected to first to n-th word lines WL1 to WLn, and gates of the drain select transistors DST may be connected to drain select lines DSL. Here, a group of memory cells connected to the word lines WL1 to WLn, respectively, is referred to as a page PG. For example, a group of the first memory cells F1 connected to the first word line WL1 among the memory cells F1 to Fn included in the different cell strings ST may be one physical page PPG. The program and read operations may be performed in a unit of the physical page PPG.

Figure 6:
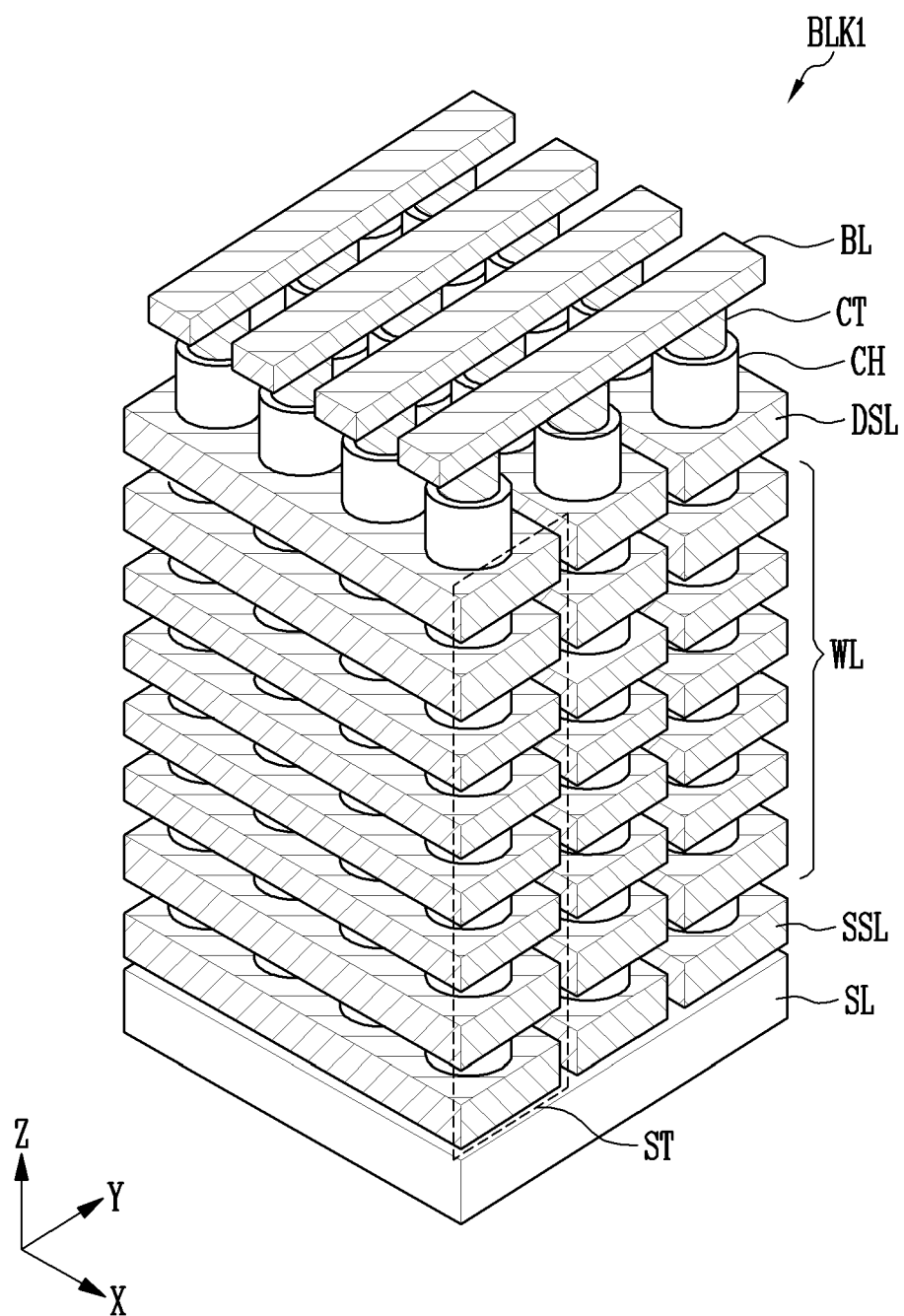
FIG. 6 is a diagram for illustrating an embodiment in which the memory block of FIG. 4 is configured in three dimensions.

FIG. 6 is a diagram for illustrating an embodiment in which the memory block of FIG. 4 is configured in three dimensions.

Referring to FIG. 6, the first memory block BLK1 among the plurality of memory blocks BLK1 to BLKz shown in FIG. 4 is shown. The remaining memory blocks BLK2 to BLKz may have the same shape as the first memory block BLK1.

The memory block BLK1 implemented in a three-dimensional structure may be formed in a vertical (Z direction) direction on a substrate and may have an I shape, and may include the plurality of cell strings ST arranged between the bit lines BL and the source line SL. Alternatively, a well may be formed instead of the source line SL. Such a structure is also referred to as bit cost scalable (BiCS). For example, when the source line SL is horizontally formed on the substrate, the cell strings ST having the BiCS structure may be formed in the vertical direction (Z direction) on the source line SL.

More specifically, the cell strings ST may be arranged in each of a first direction (X direction) and a second direction (Y direction). The cell strings ST may include the source select lines SSL, the word lines WL, and the drain select lines DSL that are stacked and spaced apart from each other. The number of the source select lines SSL, word lines WL, and drain select lines DSL is not limited to the number shown in the drawing, and may be different according to the memory device 1100. The cell strings ST may include a vertical channel film CH vertically passing through the source select lines SSL, the word lines WL, and the drain select lines DSL, and the bit lines BL which are in contact with an upper portion of the vertical channel film CH protruded to an upper portion of the drain select lines DSL and extend in the second direction (Y direction). The memory cells may be formed between the word lines WL and the vertical channel films CH. A contact plug CT may be further formed between the bit lines BL and the vertical channel films CH.

Figure 7:
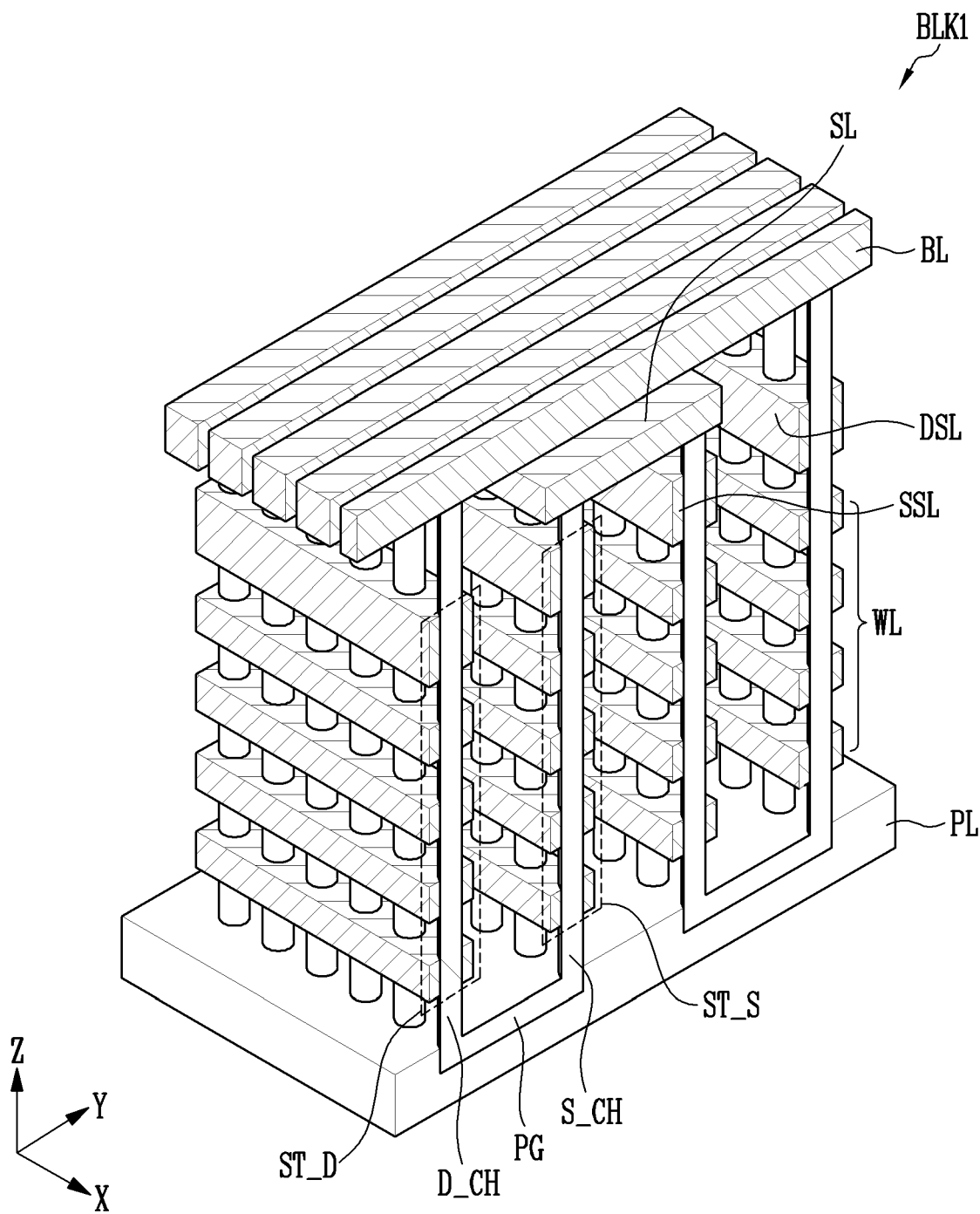
FIG. 7 is a diagram for illustrating another embodiment in which the memory block of FIG. 4 is configured in three dimensions.

FIG. 7 is a diagram for illustrating another embodiment in which the memory block of FIG. 4 is configured in three dimensions.

Referring to FIG. 7, the first memory block BLK1 among the plurality of memory blocks BLK1 to BLKz shown in FIG. 4 is shown. The remaining memory blocks BLK2 to BLKz may have the same shape as the first memory block BLK1.

The first memory block BLK1 implemented in a three-dimensional structure may be formed in a vertical direction (Z direction) on a substrate and may have a U shape, and may include a pair of source strings ST_S and drain strings ST_D connected between the bit lines BL and the source lines SL. The source strings ST_S and the drain strings ST_D may be connected to each other through a pipe gate PG to form a U-shaped structure. The pipe gate PG may be formed in a pipeline PL. More specifically, the source strings ST_S may be vertically formed between the source lines SL and the pipeline PL, and the drain strings ST_D may be vertically formed between the bit lines BL and the pipeline PL. Such a structure is also referred to as pipe-shaped bit cost scalable (P-BiCS).

More specifically, the drain strings ST_D and the source strings ST_S may be arranged in the first direction (X direction) and the second direction (Y direction), respectively, and the drain strings ST_D and the source strings ST_S may be alternately arranged along the second direction Y. The drain strings ST_D may include the word lines WL and the drain select line DSL that are stacked and spaced apart from each other, and drain vertical channel films D_CH vertically passing through the word lines WL and the drain select lines DSL. The source strings ST_S may include the word lines WL and the source select line SSL that are stacked and spaced apart from each other, and source vertical channel films S_CH vertically passing through the word lines WL and the source select lines SSL. The drain vertical channel films D_CH and the source vertical channel films S_CH may be connected to each other by the pipe gate PG in the pipeline PL. The bit lines BL may be in contact with an upper portion of the drain vertical channel films D_CH protruded to an upper portion of the drain select line DSL and may extend in the second direction (Y direction).

Figure 8:
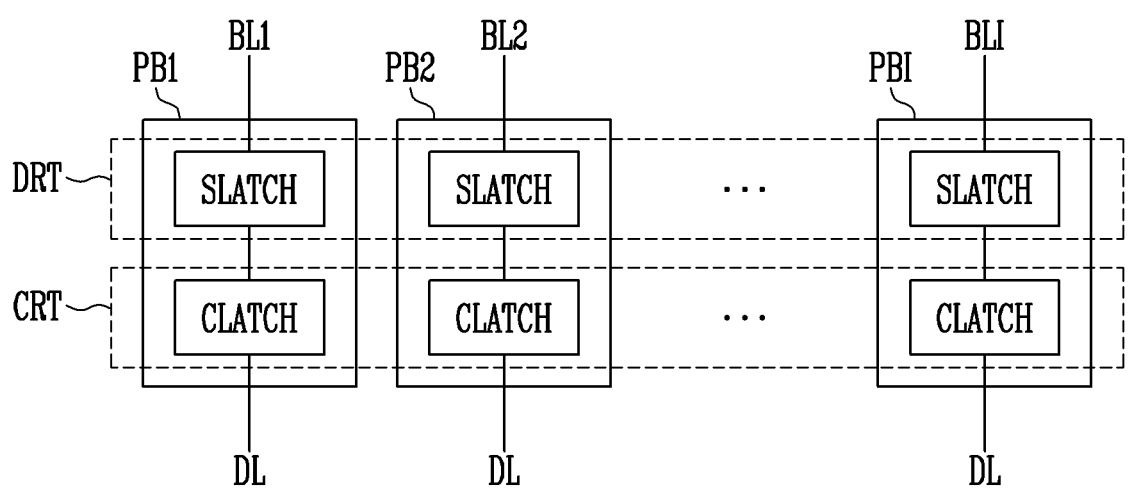
FIG. 8 is a diagram in which some of page buffers according to FIG. 3 are embodied.

FIG. 8 is a diagram in which some of the page buffers among the plurality of page buffers, for example the page buffers shown in FIG. 3 are embodied.

Referring to FIG. 8, each of the page buffers PB1, PB2, . . . , and PBI may include a sensing latch SLATCH and a cache latch CLATCH.

The page buffers PB1, PB2, . . . , and PBI may operate in response to the control signals PBSIGNALS of the control logic 300 during the read operation. Specifically, the control logic 300 may receive the cache read command from the memory controller 1200, the control logic 300 may generate the control signals PBSIGNALS for controlling the cache read operation of the page buffers PB1, PB2, . . . , and PBI and transmit the control signals PBSIGNALS to the page buffers PB1, PB2, . . . , and PBI in response to the cache read command, and the page buffers PB1, PB2, . . . , and PBI may perform the cache read operation in response to the page buffer control signals PBSIGNALS.

The sensing latch SLATCH may store data sensed from the bit line. The data sensed from the bit line may be data determined according to a threshold voltage characteristic of memory cells connected to a word line selected from local word lines. For example, the sensing latch SLATCH of the first page buffer PB1 may be connected to the first bit line BL1 and may store data sensed from the first bit line BL1.

The cache latch CLATCH may be electrically connected to the sensing latch SLATCH and may cache (or store) the data stored in the sensing latch SLATCH, in response to the page buffer control signals PBSIGNALS. In addition, the cache latch CLATCH may be connected to the data lines DL and output the cached data to the column decoder 240 through the data lines DL.

The sensing latches SLATCH included in the page buffers PB1, PB2, . . . , and PBI may be referred to as one data register DRT, and the cache latches CLATCH included in the page buffers may be referred to as one cache register CRT. At this time, since the data register DRT and the cache register CRT store or cache the data sensed from the memory cells connected to the one word line, the data register DRT and the cache register CRT may store data corresponding to one page.

The data cached in the cache register CRT may be output to the input/output pad DQ through the column decoder 240 and the input/output circuit 250, and the memory controller 1200 may receive the data cached in the cache register CRT through the input/output pad DQ in response to the cache read command transmitted to the control logic 300.

Figure 9:
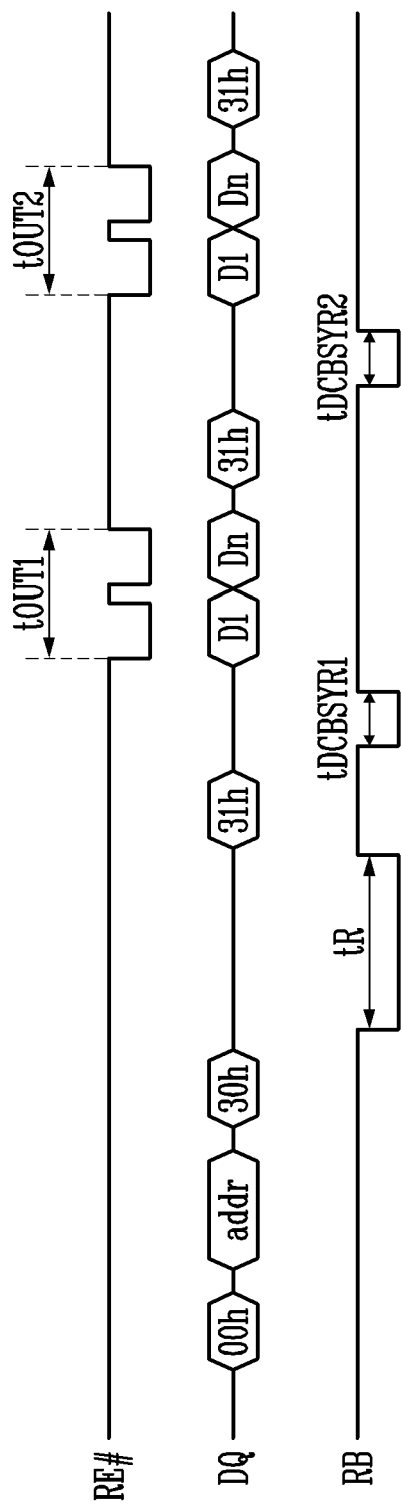
FIG. 9 is a waveform diagram for illustrating a cache read operation according to an embodiment of the present disclosure.
Figure 10:
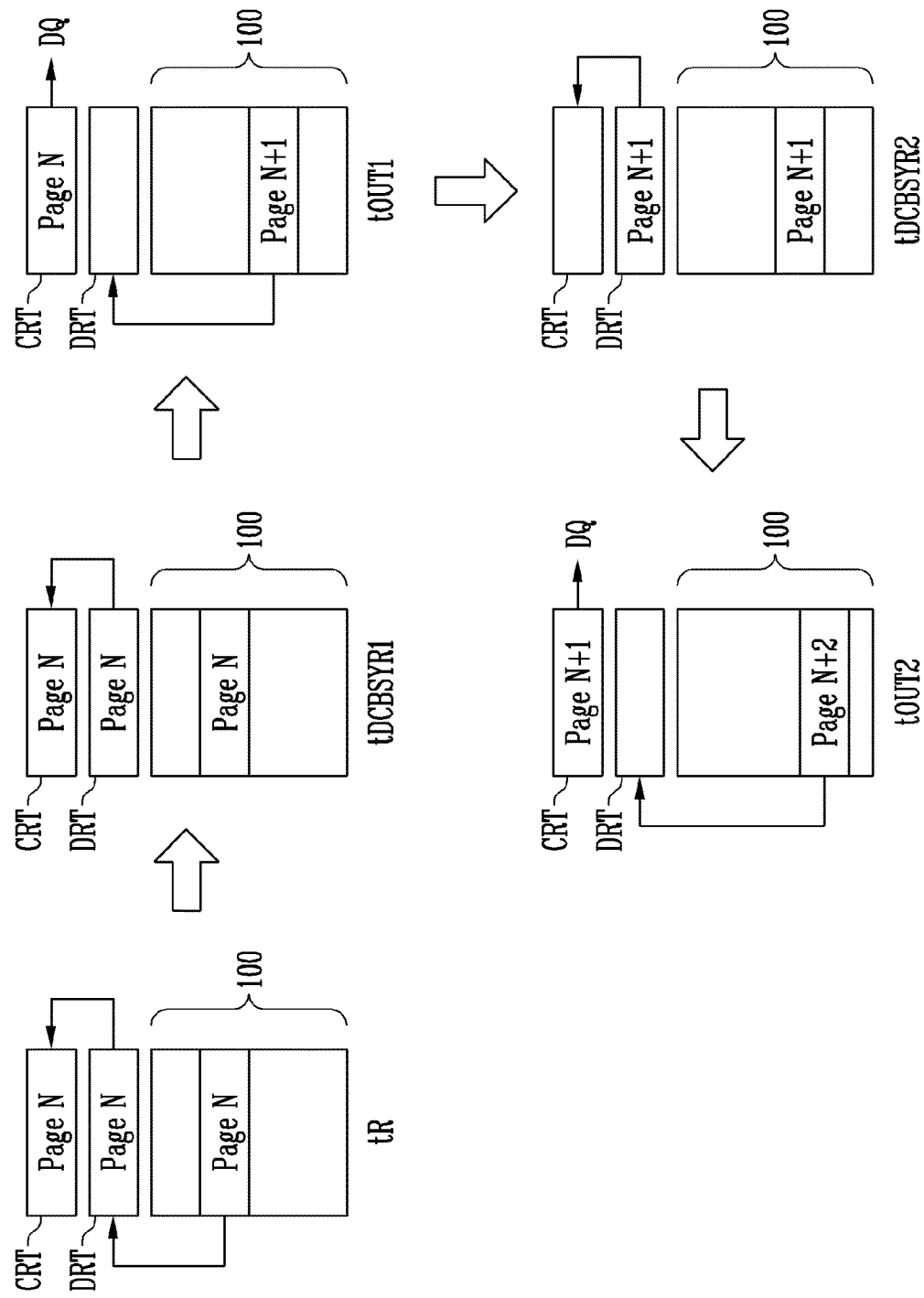
FIG. 10 is a diagram for illustrating a data register and a cache register corresponding to the waveform diagram according to FIG. 9.

FIG. 9 is a waveform diagram for illustrating a cache read operation according to an embodiment of the present invention. FIG. 10 is a diagram for illustrating a data register and a cache register corresponding to the waveform diagram according to FIG. 9.

Referring to FIG. 9, for the cache read operation, the memory controller 1200 may first transmit a normal read command 00h-30h and an address addr to the memory device 1100 through the input/output pad DQ. In response to the normal read command 00h-30h, the control logic 300 may transmit the ready-busy signal (for example, a low level signal in FIG. 9) indicating the busy state of the memory device 1100 during the normal read period tR, to the memory controller 1200 through the RB pad. Referring to FIG. 10, during the normal read period tR, the control logic 300 may sense (or read) an N-th page Page N (N is a natural number equal to or greater than 1) corresponding to the address addr in the memory cell array 100, store the N-th page Page N in the data register DRT, and may cache the N-th page Page N, which is stored in the data register DRT, in the cache register CRT, by controlling the peripheral circuit 200.

When the normal read period tR elapses, the control logic 300 may transmit the ready-busy signal indicating an idle state (for example, a high level signal in FIG. 9) to the memory controller 1200 through the RB pad. The memory controller 1200 may check the idle state through the ready-busy signal, and transmit the cache read command 31h to the memory device 1100.

In response to the cache read command 31h, the control logic 300 may transmit the ready-busy signal (for example, the low level signal in FIG. 9) indicating the busy state of the memory device 1100 during a first cache read period tDCBSYR1 to the memory controller 1200 through the RB pad. Referring to FIG. 10, during the first cache read period tDCBSYR1, the control logic 300 may cache the N-th page Page N, which is stored in the data register DRT, in the cache register CRT again, by controlling the peripheral circuit 200.

When the first cache read period tDCBSYR1 elapses, the control logic 300 may transmit the ready-busy signal indicating the idle state to the memory controller 1200 through the RB pad. Referring to FIGS. 9 and 10, during a first output period tOUT1 after the first cache read period tDCBSYR1, the control logic 300 may output the N-th page Page N, which is cached in the cache register CRT, to the input/output pad DQ through the column decoder 240 and the input/output circuit 250, and may simultaneously store an (N+1)-th page Page N+1 of the memory cell array 100 in the data register DRT. At this time, the N-th page Page N may be output to the input/output pad DQ according to a clock of the read enable signal received through the RE # pad.

After the N-th page Page N is transferred to the memory controller 1200 through the input/output pad DQ, the memory controller 1200 may transmit the cache read command 31h to the memory device 1100 again.

In response to the cache read command 31h, the control logic 300 may transmit the ready-busy signal (for example, the low level signal in FIG. 9) indicating the busy state of the memory device 1100 during a second cache read period tDCBSYR2 to the memory controller 1200 through the RB pad. Referring to FIG. 10, during the second cache read period tDCBSYR2, the control logic 300 may cache the (N+1)-th page Page N+1, which is stored in the data register DRT, in the cache register CRT, by controlling the peripheral circuit 200.

When the second cache read period tDCBSYR2 elapses, the control logic 300 may transmit the ready-busy signal indicating the idle state to the memory controller 1200 through the RB pad. Referring to FIGS. 9 and 10, during a second output period tOUT2 after the second cache read period tDCBSYR2, the control logic 300 may output the (N+1)-th page Page N+1, which is cached in the cache register CRT, to the input/output pad DQ through the column decoder 240 and the input/output circuit 250, and may simultaneously store an (N+2)-th page Page N+2 of the memory cell array 100 in the data register DRT. At this time, the (N+1)-th page Page N+1 may be output to the input/ output pad DQ according to the clock of the read enable signal received through the RE # pad.

Thereafter, the memory controller 1200 may repeatedly transmit the cache read command 31h to the memory device 1100, and the memory device 1100 may perform the same operation as the above-described method on other pages in response to each cache read command 31h. Specifically, the above-described cache read operation may be repeated until the last cache read command 3Fh is received from the memory controller 1200 to the memory device 1100. When the last cache read command 3Fh is received, the control logic 300 may cache the data, which is stored in the data register DRT, in the cache register CRT, and output the data cached in the cache register CRT through the input/output pad DQ, rather than storing the data in the data register DRT by sensing a new page from the memory cell array 100.

As described above, since the cache read operation outputs a page cached in the cache register CRT and simultaneously reads a new page from the memory cell array 100 and stores the new page in the data register DRT, pages of the memory cell array 100 may be read at a very high fast.

The cache read periods including the first cache read period tDCBSYR1 and the second cache read period tDCBSYR2 may be shorter than the normal read period tR.

Both of the first cache read period tDCBSYR1 and the second cache read period tDCBSYR2 may be periods in which the operation of caching the data, which is stored in the data register DRT, in the cache register CRT in response to the same cache read command 31h, and may be set as the same time intervals as each other. In addition, in the cache read periods including the first cache read period tDCBSYR1 and the second cache read period tDCBSYR2, an operation of determining one of random cache read and sequential cache read by the control logic 300, an operation of changing a column address, and the like may be further performed.

Meanwhile, referring to FIG. 10, regarding the operation performed in response to the second cache read command in the second cache read period tDCBSYR2, an operation of newly caching the (N+1)-th page Page N+1, which is stored in the data register DRT, in the cache register CRT may be performed.

However, differently from the second cache read period tDCBSYR2, the operation of caching the N-th page Page N in the cache register CRT during the first cache read period tDCBSYR1 may be redundant since the N-th page Page N is already cached in the cache register CRT during a previous normal read period tR.

That is, when all of the first cache read period tDCBSYR1 and the second cache read period tDCBSYR2 and the operations corresponding thereto are set identically, the same operation is always performed on the same cache read command. Therefore, implementation may be easy, but an unnecessary caching operation may be included. In the first cache read period tDCBSYR1 corresponding to a first cache read command after the normal read command, the caching operation of storing the data, which is stored in the data register DRT, in the cache register CRT may be skipped and the first cache read period tDCBSYR1 may be set to be shorter than other cache read periods including the second cache read period tDCBSYR2, to improve a cache read operation speed.

In an embodiment, the caching operation of storing the data, which is stored in the data register DRT, in the cache register CRT may be performed based on whether the cache read command is the first command received after receiving the normal read command from the memory controller.

For example, the control logic 300 may skip the caching operation when the cache read command received from the memory controller 1200 is the first command received after receiving the normal read command from the memory controller 1200. In addition, the first cache read period tDCBSYR1 corresponding to the cache read command as the first command may be set to be shorter than other cache read periods because the caching operation is skipped, and the control logic 300 may output the ready-busy signal indicating the busy state of the memory device 1100 during the first cache read period tDCBSYR1 set to be shorter than other cache read periods (for example, the second cache read period tDBSYR2).

Figure 11:
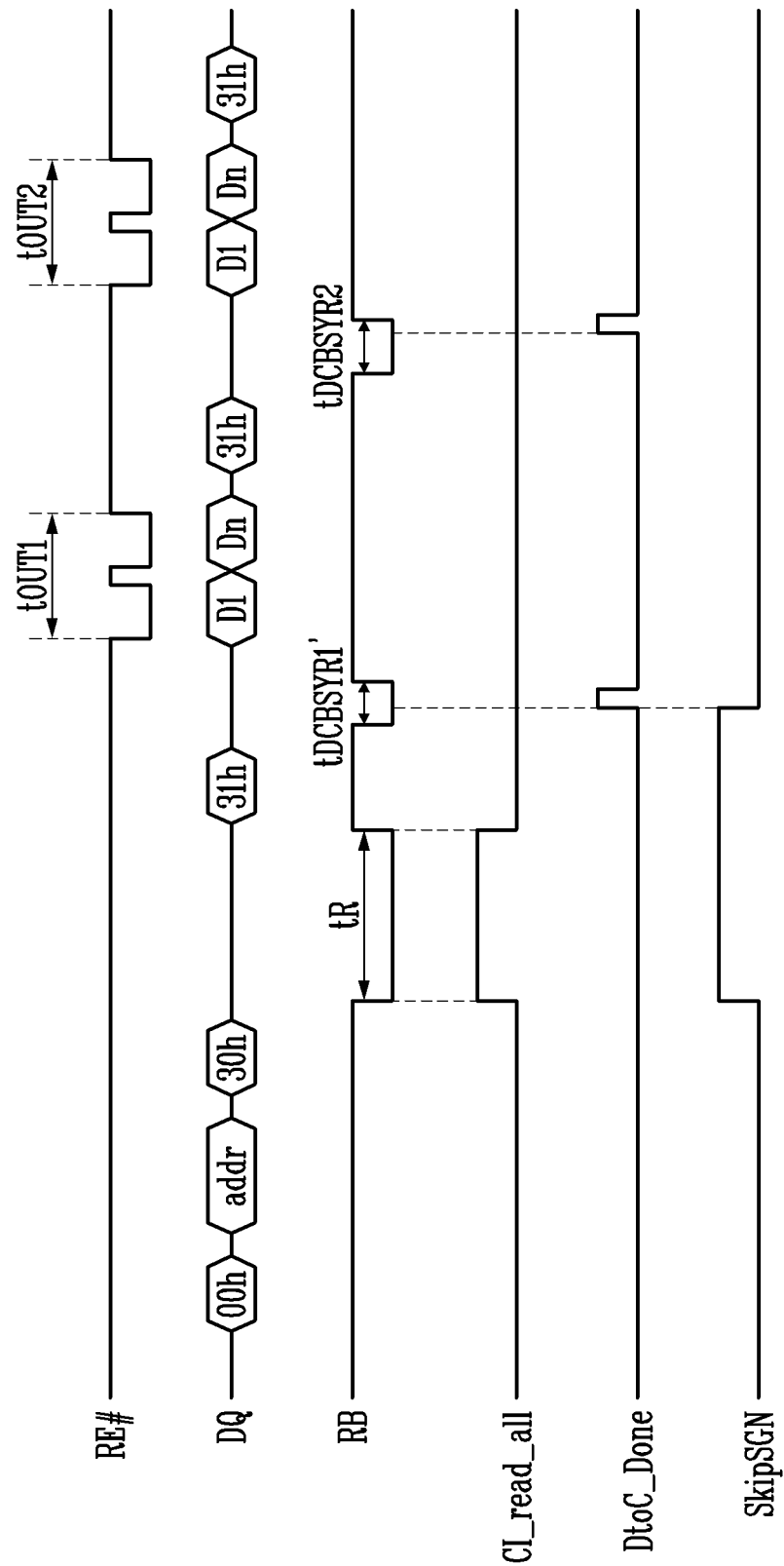
FIG. 11 is a waveform diagram for illustrating a method of partially skipping a caching operation included in the cache read operation according to FIGS. 9 and 10.
Figure 12:
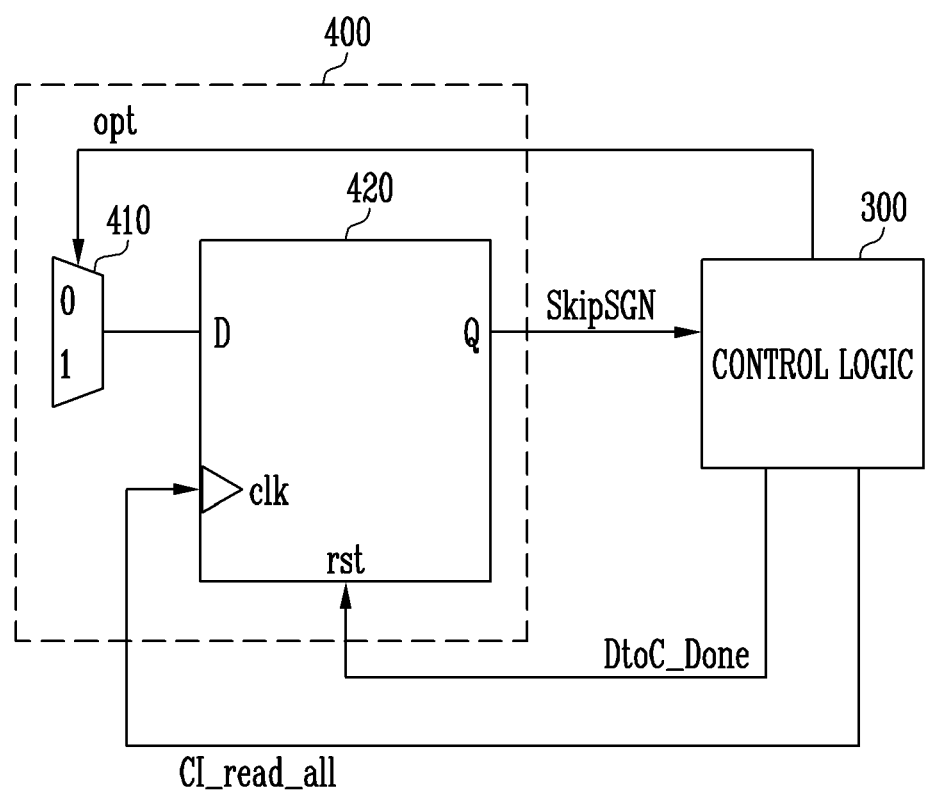
FIG. 12 is a diagram showing a skip signal generator for generating a skip signal according to FIG. 11.

FIG. 11 is a waveform diagram for describing a method of partially skipping the caching operation included in the cache read operation according to FIGS. 9 and 10. FIG. 12 is a diagram showing a skip signal generator for generating the skip signal according to FIG. 11.

Referring to FIG. 11, the control logic 300 may receive the normal read command from the memory controller 1200, and may generate a normal read signal CI_read_all activated (or having a high level) during a period corresponding to the normal read period tR, in response to the normal read command.

In addition, the control logic 300 may determine whether the data, which is stored in the data register DRT, is stored in the cache register CRT, in each of the cache read periods including the first cache read period tDCBSYR1' and the second cache read period tDCBSYR2, and may generate a caching completion signal DtoC_Done activated (or having a high level) when the data, which is stored in the data register DRT, is stored in the cache register CRT.

In an embodiment, the skip signal generator 400 may receive the normal read signal CI_read_all and the caching completion signal DtoC_Done from the control logic 300, and may generate the skip signal SkipSGN instructing to skip the caching operation of storing the data, which is stored in the data register DRT, in the cache register CRT, using the normal read signal CI_read_all and the caching completion signal DtoC_Done.

The control logic 300 may check the skip signal SkipSGN in each of the cache read periods including the first cache read period tDCBSYR1' and the second cache read period tDCBSYR2, and may skip the cache operation based on the skip signal SkipSGN.

For example, referring to FIG. 11, the skip signal SkipSGN may be activated to a high level in response to the normal read signal CI_read_all, and may be deactivated to a low level in response to the caching completion signal DtoC_Done.

Therefore, the control logic 300 may skip the caching operation of storing the data, which is stored in the data register DRT, in the cache register CRT, based on the skip signal SkipSGN having a high level in the first cache read period tDCBSYR1', and set the first cache read period tDCBSYR1' shorter than the second cache read period tDCBSYR2.

In addition, the control logic 300 may perform the caching operation of storing the data, which is stored in the data register DRT, in the cache register CRT, based on the skip signal SkipSGN having a low level in other cache read periods including the second cache read period tDCBSYR2.

As described above, since the skip signal SkipSGN is deactivated to a low level in the first cache read period tDCBSYR1' and stays deactivated to the low level until the cache read operation is ended, the control logic 300 may skip the caching operation of storing the data, which is stored in the data register DRT, in the cache register CRT in response to the cache read command as the first command.

In order to generate the above-described skip signal SkipSGN, the skip signal generator 400 may be implemented as the configuration shown in FIG. 12.

Referring to FIG. 12, the skip signal generator 400 may include a flip-flop 420 configured to receive one of a high level signal 1 and a low level signal 0 through an input terminal D, receive the normal read signal CI_read_all through a clock terminal clk, output through an output terminal Q the signal received through the input terminal D according to the normal read signal CI_read_all, receive the caching completion signal DtoC_Done through a reset terminal rst and reset the output of the output terminal Q according to the caching completion signal DtoC_Done. For example, the flip-flop 420 may be a D-flip-flop.

One of a high level signal 1 and a low level signal 0 may be applied to the input terminal D. For example, the high level signal 1 may be a signal having a high level and may activate the skip signal SkipSGN to a high level, and the low level signal 0 may be a signal having a low level and may deactivate the skip signal SkipSGN to a low level.

The signal applied to the input terminal D may be output through the output terminal Q when the normal read signal CI_read_all is applied to the clock terminal clk. For example, when the high level signal 1 is applied to the input terminal D, the high level signal 1 may be output as the skip signal SkipSGN activated to the high level as the normal read signal CI_read_all is applied to the clock terminal clk.

At this time, when the caching completion signal DtoC_Done is received through the reset terminal rst, the skip signal SkipSGN output through the output terminal Q is reset to become deactivated to a low level, and thus the deactivated skip signal SkipSGN may be output. Since the high level signal 1, which is applied to the input terminal D is not transferred to the output terminal Q unless the normal read signal CI_read_all is supplied through the clock terminal clk again, the skip signal SkipSGN may stay deactivated.

Meanwhile, the skip signal generator 400 may further include a multiplexer 410 selecting one of the high level signal 1 and the low level signal 0 and outputting the selected signal to the input terminal D of the flip-flop 420. The multiplexer 410 may receive a signal opt instructing to enable or disable a skip function for the caching operation from the control logic 300, and may select one of the high level signal 1 and the low level signal 0 according to the received signal opt. For example, when receiving the signal opt to enable the skip function for the caching operation from the control logic 300, the multiplexer 410 may output the high level signal 1 to the input terminal D. When receiving the signal opt to disable the skip function for the caching operation from the control logic 300, the multiplexer 410 may output the low level signal 0 to the input terminal D.

Meanwhile, in FIGS. 11 to 12, the control logic 300 receives the skip signal SkipSGN from the skip signal generator 400, but is not limited thereto. For example, the control logic 300 may include the skip signal generator 400, and may skip the caching operation without generating a separate skip signal SkipSGN.

Specifically, the control logic 300 may determine whether the data, which is stored in the data register DRT, is stored in the cache register CRT in each of the cache read periods in response to the cache read command, and may skip the caching operation when the data, which is stored in the data register DRT, is stored in the cache register CRT. At this time, the control logic 300 may set the cache read period to be shorter than other cache read periods, and output the ready-busy signal indicating the busy state corresponding to the cache read period, which is set to be short, through the RB pad.

Figure 13:
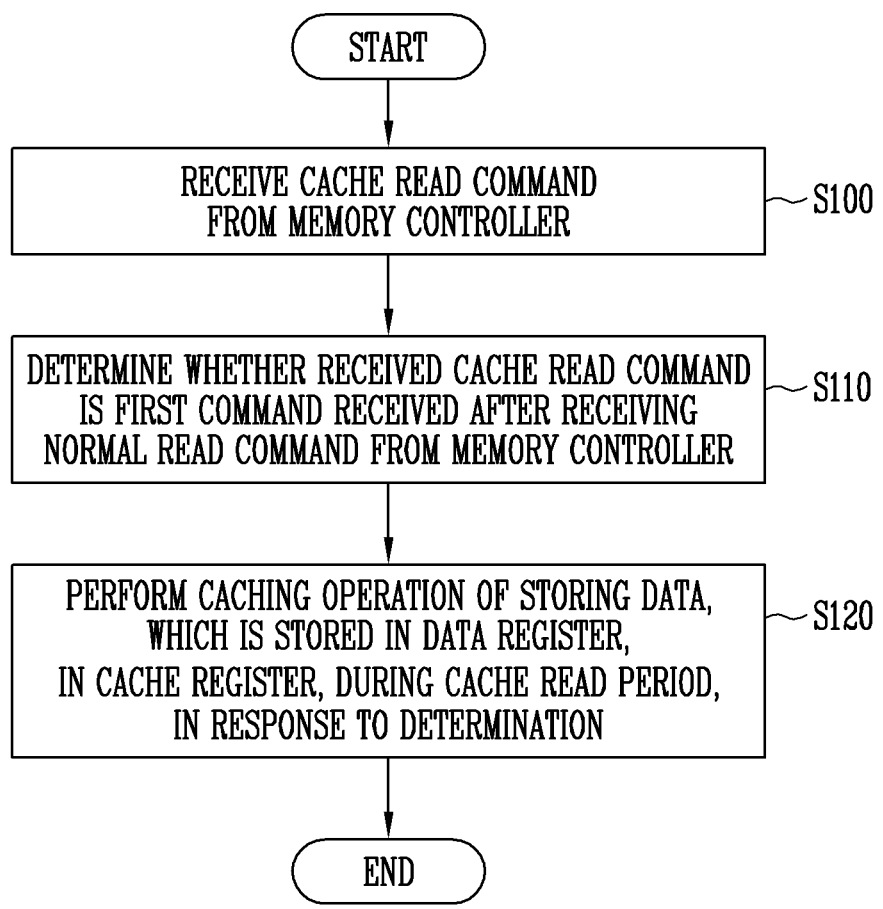
FIG. 13 is a flowchart illustrating a method of operating a memory device according to an embodiment of the present disclosure.

FIG. 13 is a flowchart illustrating a method of operating a memory device according to an embodiment of the present disclosure.

Referring to FIG. 13, a method of operating a memory device according to an embodiment may include receiving a cache read command from a memory controller (S100), determining whether the received cache read command is a first command received after receiving a normal read command from the memory controller (S110), and performing a caching operation of storing data, which is stored in a data register, in a cache register according to the determination (S120).

The caching operation (S120) may be performed when the cache read command is not the first command.

The determining (S110) may include determining whether to skip the performing of the caching operation according to whether the data, which is stored in the data register, is stored in the cache register during the cache read period.

The performing of the caching operation (S120) may include outputting a ready-busy signal indicating a busy state of the memory device 1100 to the memory controller during the cache read period.

The outputting may include outputting the ready-busy signal indicating the busy state of the memory device 1100 to the memory controller during a period shorter than the cache read period when the cache read command is the first command.

The method of operating a memory device according to an embodiment may further include activating a skip signal instructing to skip the caching operation according to the determination.

The skip signal may be activated based on a normal read signal corresponding to a normal read period longer than the cache read period in response to the normal read command.

The method of operating a memory device according to an embodiment may further include deactivating the skip signal based on a caching completion signal indicating whether the data, which is stored in the data register, is stored in the cache register, during the cache read period.

The method of operating the memory device according to an embodiment should be interpreted as including the configuration or the operation described with reference to FIGS. 1 to 12.

Figure 14:
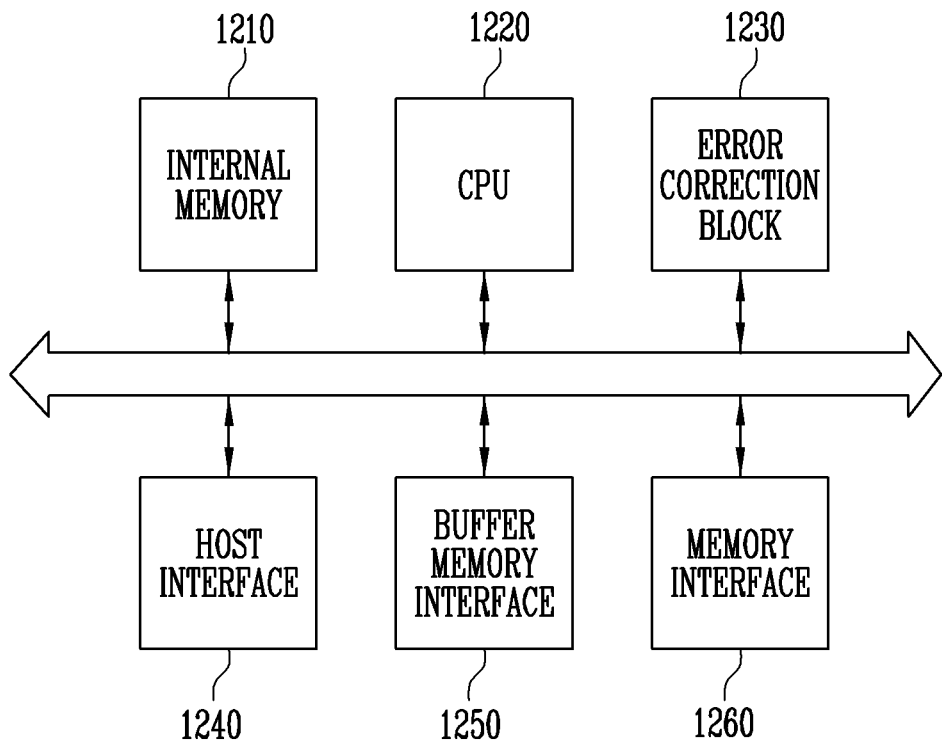
FIG. 14 is a diagram for illustrating the memory controller of FIG. 1.

FIG. 14 is a diagram for specifically describing the memory controller of FIG. 1.

Referring to FIG. 14, the memory controller 1200 may include an internal memory 1210, a central processing unit (CPU) 1220, an error correction block 1230, a host interface 1240, a buffer memory interface 1250, and a memory interface 1260.

The internal memory 1210 may store various information necessary for an operation of the memory controller 1200. For example, the internal memory 1210 may include logical and physical address map tables. The internal memory 1210 may be configured of at least one of, but not limited to, a random access memory (RAM), a dynamic RAM (DRAM), a static RAM (SRAM), a cache, and a tightly coupled memory (TCM).

The CPU 1220 may perform various operations for controlling the memory device 1100 or generate various commands. When the CPU 1220 receives a request from the host 2000, the CPU 1220 may generate a command according to the received request and transmit the generated command to the error correction block 1230.

The error correction block 1230 is configured to detect and correct an error of data received from the memory device 1100 using an error correction code (ECC). The CPU 1220 may control the memory device 1100 to adjust a read voltage according to an error detection result of the error correction block 1230 and perform re-reading. As an embodiment, the error correction block may be provided as a component of the memory controller 1200.

The host interface 1240 may exchange a command, an address, and data between the memory controller 1200 and the host 2000. For example, the host interface 1240 may receive the request, the address, and the data from the host 2000, and output data read from the memory device 1100 to the host 2000. The host interface 1240 may communicate with the host 2000 using a protocol such as, for example, peripheral component interconnect express (PCIe), advanced technology attachment (ATA), serial ATA (SATA), parallel ATA (PATA), serial attached SCSI (SAS) or non-volatile memory express (NVMe). The host interface 1240 is not limited to the above-described example, and may include various interfaces such as universal serial bus (USB), multi-media card (MMC), enhanced small disk interface (ESDI), or integrated drive electronics (IDE).

The buffer memory interface 1250 may transmit data between the CPU 1220 and a buffer memory (not shown) of the memory system 1000. The buffer memory (not shown) may be used as an operation memory or a cache memory of the memory controller 1200, and may store system data used in the memory system 1000 in addition to the above-described information. According to an embodiment, the buffer memory (not shown) may include a double data rate synchronous dynamic random access memory (DDR SDRAM), a DDR4 SDRAM, a low power double data rate 4 (LPDDR4) SDRAM, a graphics double data rate (GDDR) SDRAM, a low power DDR (LPDDR), or a Rambus dynamic random access memory (RDRAM). When the buffer memory is included in the memory controller 1200, the buffer memory interface 1250 may be omitted.

The memory interface 1260 may exchange the command, the address, and the data between the memory controller 1200 and the memory device 1100. For example, the memory interface 1260 may transmit the command, the address, and the data to the memory device 1100 through a channel, and may receive the data and the like from the memory device 1100.

Figure 15:
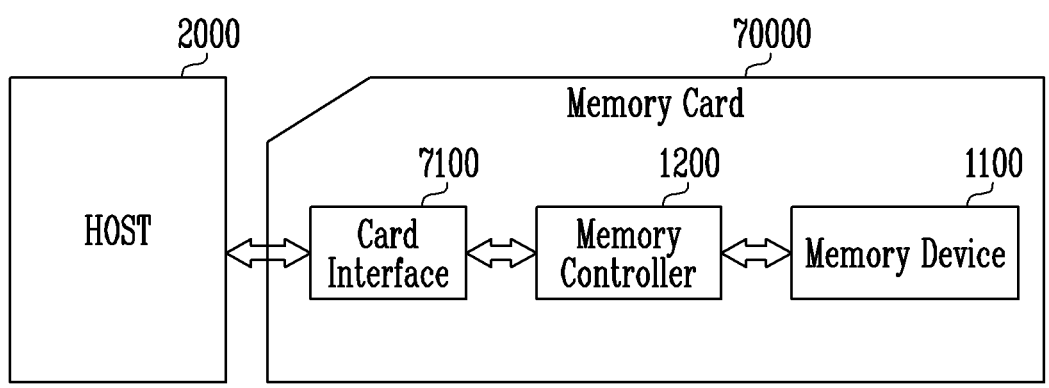
FIG. 15 is a diagram for illustrating another embodiment of the memory system according to FIG. 1.

FIG. 15 is a diagram for describing another embodiment of the memory system according to FIG. 1.

Referring to FIG. 15, a memory system may include the host 2000 and a memory card 70000.

The memory card 70000 may be implemented as a smart card. The memory card 70000 may include the memory device 1100, the memory controller 1200, and a card interface 7100.

The memory controller 1200 may control data exchange between the memory device 1100 and the card interface 7100. According to an embodiment, the card interface 7100 may be a secure digital (SD) card interface or a multi-media card (MMC) interface, but is not limited thereto. In addition, the card interface 7100 may interface data exchange between the host 2000 and the memory controller 1200 according to a protocol of the host 2000. According to an embodiment, the card interface 7100 may support a universal serial bus (USB) protocol, and an interchip (IC)-USB protocol. Here, the card interface 7100 may refer to hardware capable of supporting a protocol that is used by the host 2000, software installed in the hardware, or a signal transmission method.

What is claimed is:

1. A memory device comprising:
a memory cell array including a plurality of memory cells;
a data register connected to the memory cell array through a bit line and configured to store data sensed through the bit line;
a cache register configured to cache the data stored in the data register;
a controller configured to control a caching operation of storing the data, which is stored in the data register, in the cache register during a cache read period based on whether a cache read command is firstly received after receiving a normal read command from a memory controller; and
a skip signal controller configured to supply a skip signal instructing the controller to skip the caching operation in response to the cache read command being firstly received.

2. The memory device of claim 1, wherein the controller controls the caching operation to be performed during the cache read period when the cache read command is not firstly received.

3. The memory device of claim 2, wherein the controller is further configured to output a ready-busy signal indicating a busy state of the memory device to the memory controller during the cache read period.

4. The memory device of claim 3, wherein the controller outputs the ready-busy signal indicating the busy state to the memory controller during a period shorter than the cache read period when the cache read command is firstly received.

5. The memory device of claim 1, wherein the controller is further configured to determine whether the data stored in the data register is stored in the cache register during the cache read period and determine whether to skip the caching operation according to the determination.

6. The memory device of claim 1, wherein the controller is further configured to supply a normal read signal corresponding to a normal read period longer than the cache read period to the skip signal controller in response to the normal read command.

7. The memory device of claim 6, wherein the skip signal controller is further configured to activate the skip signal based on the normal read signal.

8. The memory device of claim 6, wherein the controller is further configured to generate a caching completion signal indicating whether the data, which is stored in the data register, is stored in the cache register during the cache read period.

9. The memory device of claim 8, wherein the skip signal controller is further configured to deactivate the skip signal based on the caching completion signal.

10. The memory device of claim 8, wherein the skip signal controller includes a flip-flop configured to:
receive the normal read signal, the caching completion signal and one of a high level signal and a low level signal;
output the received one of the high level signal and the low level signal according to the normal read signal; and
reset the output in response to the caching completion signal.

11. The memory device of claim 10, wherein the skip signal controller further includes a multiplexer configured to select one of the high level signal and the low level signal and output the selected one to the flip-flop.

12. A method of operating a memory device, the method comprising:
receiving a cache read command from a memory controller; and
activating a skip signal instructing to skip a caching operation of storing data, which is stored in a data register, in a cache register, in response to the cache read command being a command firstly received after receiving a normal read command from the memory controller.

13. The method of claim 12, wherein the caching operation is performed when the cache read command is not the command firstly received.

14. The method of claim 12, further comprising determining whether to skip the caching operation according to whether the data, which is stored in the data register, is stored in the cache register during a cache read period.

15. The method of claim 12, wherein the caching operation comprises outputting a ready-busy signal indicating a busy state of the memory device to the memory controller during a cache read period.

16. The method of claim 15, further comprising outputting the ready-busy signal indicating the busy state to the memory controller during a period shorter than the cache read period when the cache read command is the command firstly received.

17. The method of claim 12, wherein the skip signal is activated based on a normal read signal corresponding to a normal read period longer than a cache read period in response to the normal read command.

18. The method of claim 12, further comprising deactivating the skip signal based on a caching completion signal indicating whether the data, which is stored in the data register, is stored in the cache register, during a cache read period.

* * * * *